3,849,446
CHROMONE-3-CARBOXYLIC ACIDS

Max von Strandtmann, Rockaway Township, Sylvester Klutchko, Hackettstown, Daniel Kaminsky, Parsippany, and John Shavel, Jr., Mendham, N.J., assignors to Warner-Lambert Company, Morris Plains, N.J.
No Drawing. Filed Jan. 17, 1972, Ser. No. 218,503
Int. Cl. C07d 7/34
U.S. Cl. 260—345.2                 7 Claims

ABSTRACT OF THE DISCLOSURE

This invention is concerned with chromone-3-carboxylic acids and esters having the formula:

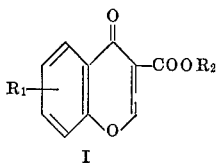

wherein $R_1$ is hydrogen, halogen, lower alkoxy, nitro, hydroxy, acetamido, lower alkyl, aryl, aryl lower alkyl and $R_2$ is hydrogen or lower alkyl. These compounds are useful as antiallergic agents.

---

The present invention is concerned with chromone-3-carboxyllic acids of the formula:

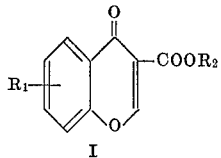

wherein $R_1$ is hydrogen, halogen, nitro, hydroxy, lower alkoxy, amino, acetamido, lower alkyl, aryl, e.g. phenyl, aryl lower alkyl, e.g. phenyl lower alkyl, and $R_2$ is hydrogen or lower alkyl.

The compounds of this invention are active in the prevention of allergic and asthmatic reactions. For example, in tests conducted by the procedures described in Mota, *Life Science*, 7, 465 (1963) and Bier, *Proc. Soc. Exptl. Biol. Med.*, 81, 584 (1952), these compounds are capable of protecting the rats from allergic and asthmatic reactions at a dose level of 5–100 mg./kg. intraperitoneally.

These compounds are indicated in providing symptomatic relief in allergic conditions such as asthma, hay fever and the like. In order to use these compounds, they are combined with pharmaceutical diluents such as lactose and formulated into dosage forms such as tablets. Generally speaking, a dose of 5–100 mg./kg. is suggested for relieving allergic conditions.

Compounds of type I wherein $R_2$ is hydrogen are prepared by the sodium dichromate oxidation of compounds of type II:

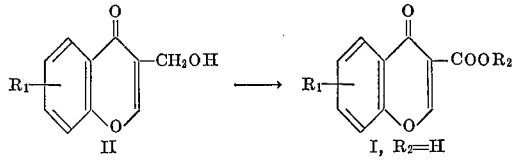

The preparation of compounds of Type II is described in our copending application No. 112,765, filed Feb. 4, 1971.

The carboxylic acids of type I wherein $R_2$ is hydrogen are converted to esters by pre-treatment with thionyl chloride to form the acid chloride followed by addition of an alcohol:

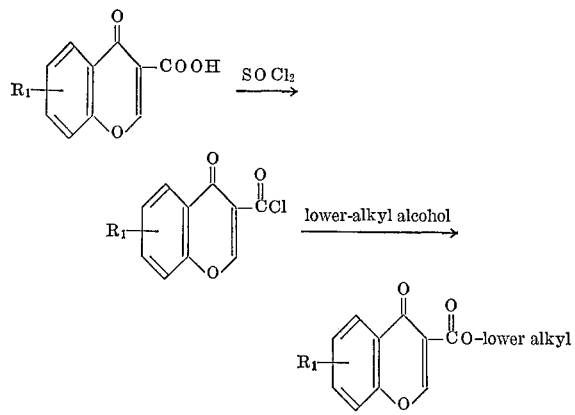

To further illustrate the practice of this invention, the following examples are included:

EXAMPLE 1

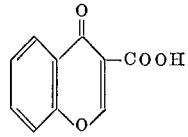

*4-Oxo-4H-1-benzopyran-3-carboxylic acid.*—A mixture of 78.0 g. (0.443 mole) of 3-(hydroxymethyl)chromone, 7.45 g. (0.25 mole) of sodium dichromate dihydrate and one liter of water was cooled to 10° C. With ice-acetone bath cooling and stirring a quantity of 200 ml. of cold 50% sulfuric acid was added. The highest temperature rise is to 18° C. Upon cooling to 10° C., another 200 ml. of 50% sulfuric acid is added. The temperature rose to 19° C. and remained there for about five minutes even with good cooling, indicating an exothermic reaction. Some $CO_2$ was evolved. Upon cooling to 10° C. another portion of 100 ml. of 50% sulfuric acid is added. The temperature rose to 14° C. The ice bath was removed and the reaction mixture was stirred at room temperature overnight. The insolubles were filtered and washed well with water. The damp filter cake was slurried in 500 ml. of saturated sodium bicarbonate. After 15 minutes stirring, the mixture was filtered and washed with 50 ml. of water. (The filter cake was mostly starting material). The filtrate was acidified slowly with concetrated hydrochloric acid to give a somewhat soapy precipitate. This crude carboxylic acid was filtered, washed well with water and dried. Weight 6.0 g. (7.17% yield). Recrystallization from 480 ml. of hot ethyl acetate (with a charcoal treatment) gave 3.8 g. of pure carboxylic acid melting at 198–200° C. One additional recrystallization from ethyl acetate gave analytical quality product melting at 199–201° C.

*Analysis.*—Calcd. for $C_{10}H_6O_4$: C, 63.16; H, 3.18. Found: C, 62.93; H, 3.19.

The original chromic acid reaction solution yielded additional solid on standing at room temperature for nine days. The bicarbonate treatment (as described above) gave an additional 8.0 g. of crude product. After standing another 10 days the chromic acid reaction solution yielded another 4.5 g. of crude acid (after bicarbonate treatment) for a total of 18.5 g. (22.1% yield) of fair quality carboxylic acid, as indicated by thin-layer chromatography and infrared spectroscopy.

EXAMPLE 2

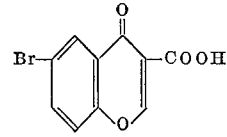

*6-Bromo - 4 - oxo-4H-1-benzopyran - 3 - carboxylic acid.*—A chromic acid solution was first prepared as follows: Concentrated sulfuric acid (200 ml.) was slowly added to a solution of 19.6 g. (0.066 mole) of sodium dichromate dihydrate in 100 ml. of water with stirring and ice bath cooling. This mixture was slowly added to a stirred solution of 25.5 g. (0.1 mole) of 6-bromo-3-(hydroxymethyl)-chromone in 250 ml. concentrated $H_2SO_4$, over 10 minutes, keeping the temperature at about 60° C. with mild cooling. The solution was allowed to stand over a weekend. Several tests showed that there was mostly aldehyde present at this stage of reaction. The solution was heated to 70° C. for six hours and then overnight at 55° C. Ice water (300 ml.) was added and the dark separate solid was filtered (mostly aldehyde). After standing six days at room temperature the aqueous filtrate yielded crude solid.

Isolation of 3-carboxylic acid: The above crude solid was triturated with 100 ml. saturated $NaHCO_3$ solution and the mixture was diluted to one liter volume with water. The insoluble material was filtered and the filtrate was acidified with concentrated HCl. The separated solid weighed 2.3 g. (8.6% yield) aind melted at 183–186° C. Recrystallization from ethylacetate gave pure, pale yellow crystals melting at 191–193° C.

*Analysis.*—Calcd. for $C_{10}H_5BrO_4$: C, 44.64; H, 1.87. Found: C, 44.74; H, 1.82.

EXAMPLE 3

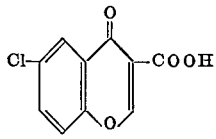

*6 - Chloro - 4 - oxo-4H-1-benzopyran - 3 - carboxylic acid.*—This compound was prepared by a dichromate oxidation of 6-chloro-3-(hydroxymethyl)chromone, employing the procedure described in Example 1. The yield was 7.4%. Analytically pure tan crystals were obtained by recrystallization from ethyl acetate; m.p. 225–227° C.

*Analysis.*—Calcd. for $C_{10}H_5ClO_4$: C, 53.48; H, 2.24; Cl, 15.78. Found: C, 53.37; H, 2.24; Cl, 15.60.

EXAMPLE 4

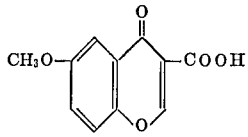

*6-Methoxy - 4 - oxo-4H-benzopyran - 3 - carboxylic acid.*—With stirring and cooling a mixture of 20.6 g. (0.1 mole) of 3-(hydroxymethyl - 6 - methoxychromone, 19.6 g. (0.066 mole) of $Na_2Cr_2O_7 \cdot 2H_2O$ and 50 ml. of water was treated with 100 ml. of concentrated $H_2SO_4$ dropwise over 15 minutes keeping the temperature at about 30° C. All solid appeared to be in solution with this quantity of sulfuric acid. The solution was heated at 75° C. for 1½ hours. Water (one l.) was added and the turbid solution was heated at 85–90° C. for three hours. To this was added (at 80° C.) a solution of 5.07 g. (0.017 mole) of $Na_2Cr_2O_7 \cdot 2H_2O$ in 30 ml. of water. The reaction was heated at 90° C. for one hour and then allowed to cool overnight. The separated solids were filtered, washed with 100 ml. of water and triturated with 200 ml. of saturated $NaHCO_3$ solution. The mixture was diluted to 500 ml. volume with water and filtered. The filtrate was made acid with concentrated HCl. The separated solid was filtered, washed with water and dried. Weight 1.7 g. (7.7% yield); m.p. 137–141° C. Recrystallization from ethyl acetate gave pure product melting at 167–169° C.

*Analysis.*—Calcd. for $C_{11}H_8O_5$: C, 60.00; H, 3.66. Found: C, 59.94; H, 3.67.

EXAMPLE 5

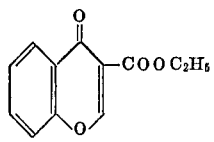

*Ethyl 4-oxo - 4H - 1 - benzopyran - 3 - carboxylate.*—A solution of 1.9 g. (0.01 mole) or 4-oxo-4H-1-benzopyran-3-carboxylic acid and 30 ml. of thionyl chloride was maintained at reflux for 10 minutes. Most of the thionyl chloride was stripped off and benzene (50 ml.) was added and distilled off to chase excess thionyl chloride. The benzene operation was repeated. Absolute ethanol (50 ml.) was added and the solution was maintained at reflux for one hour. The ethanol was removed, water (20 ml.) was added to the residue and the separated oil was extracted into 100 ml. of ether. The dried ($MgSO_4$) solution was charcoaled, filtered and concentrated to give 1.7 g. of tacky ester.

Purification: The above crude ester was heated with 50 ml. of Skellysolve "B" to reflux. Ethyl acetate was added dropwise until most of the fused material was dissolved and the solution was decanted hot from a small amount of undissolved material (containing most of the color). Oil separated in the decantate on cooling. On seeding, crystals were obtained; weight 1.1 g. (50.4% yield): m.p. 57–59° C. Further recrystallization (as above) gave pure ester; m.p. 65–67° C.

*Analysis.*—Calcd. for $C_{12}H_{10}O_4$: C, 66.05; H, 4.62. Found: C, 65.91; H, 4.58.

We claim:
1. A compound of the formula:

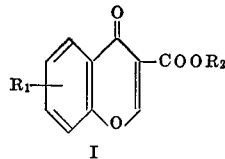

I wherein $R_1$ is hydrogen, halogen, lower alkoxy or hydroxy, and $R_2$ is hydrogen or lower alkyl.

2. A compound according to claim 1 which is 4-oxo-4H-1-benzopyron-3-carboxylic acid.
3. A compound according to claim 1 which is 6-bromo-4-oxo-4H-1-benzopyran-3-carboxylic acid.
4. A compound according to claim 1 which is 6-chloro-4-oxo-4H-1-benzopyran-3-carboxylic acid.
5. A compound according to claim 1 which is 6-methoxy-4-oxo-4H-benzopyran-3-carboxylic acid.
6. A compound according to claim 1 which is ethyl 4-oxo-4H-1-benzopyran-3-carboxylate.
7. A method for the production of a compound of claim 1 wherein $R_2$ is hydrogen which comprises treating a compound of the formula:

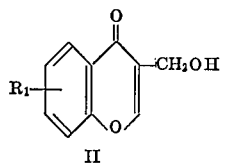

II with sodium dichromate.

References Cited
UNITED STATES PATENTS 3,484,445   12/1969   Lee et al. _____ 260—345.5

JOHN M. FORD, Primary Examiner

U.S. Cl. X.R.

260—345.5; 424—283